United States Patent
van Pinxteren et al.

(10) Patent No.: US 7,304,231 B2
(45) Date of Patent: Dec. 4, 2007

(54) APPARATUS AND METHOD FOR DESIGNATING VARIOUS SEGMENT CLASSES

(75) Inventors: Markus van Pinxteren, Munich (DE); Michael Saupe, Ilmenau (DE); Markus Cremer, Ilmenau (DE)

(73) Assignee: Fraunhofer-Gesellschaft zur Förderung der Angewandten Forschung Ev, Munich (DE)

( * ) Notice: Subject to any disclaimer, the term of this patent is extended or adjusted under 35 U.S.C. 154(b) by 375 days.

(21) Appl. No.: 11/048,693

(22) Filed: Feb. 1, 2005

(65) Prior Publication Data

US 2006/0080095 A1   Apr. 13, 2006

(30) Foreign Application Priority Data

Sep. 28, 2004   (DE)   ................... 10 2004 047 032

(51) Int. Cl.
  *G10H 1/00*    (2006.01)
  *G10H 1/18*    (2006.01)
  *G10H 7/00*    (2006.01)
  *G10L 15/00*   (2006.01)

(52) U.S. Cl. ........................ 84/615; 84/600; 84/609; 84/616; 382/173; 382/224; 704/233; 704/249

(58) Field of Classification Search .............. 84/615, 84/616, 600, 609; 704/249, 233; 382/173, 382/224

See application file for complete search history.

(56) References Cited

U.S. PATENT DOCUMENTS

| | | | | |
|---|---|---|---|---|
| 5,510,572 A | * | 4/1996 | Hayashi et al. | ............... 84/609 |
| 5,739,454 A | * | 4/1998 | Kunimoto | ................... 84/615 |
| 5,918,223 A | * | 6/1999 | Blum et al. | .................... 707/1 |
| 6,108,626 A | * | 8/2000 | Cellario et al. | ............ 704/230 |
| 6,201,176 B1 | * | 3/2001 | Yourlo | ........................ 84/609 |
| 6,225,546 B1 | * | 5/2001 | Kraft et al. | .................. 84/609 |
| 6,404,925 B1 | * | 6/2002 | Foote et al. | ................ 382/224 |
| 6,476,308 B1 | * | 11/2002 | Zhang | ......................... 84/616 |
| 6,542,869 B1 | * | 4/2003 | Foote | .......................... 704/500 |

(Continued)

FOREIGN PATENT DOCUMENTS

DE   69603743 T2   8/2000

(Continued)

OTHER PUBLICATIONS

Dannenberg, Roger and Hu, Ning. "Discovering Musical Structure in Audio Recordings" Proc. 2nd Int. Conference in Music & Artificial Intelligence (ICMAI) 2002.

(Continued)

*Primary Examiner*—Lincoln Donovan
*Assistant Examiner*—Christina Russell
(74) *Attorney, Agent, or Firm*—Thomas, Kayden, Horstemeyer & Risley, LLP

(57) ABSTRACT

For the segment class designation the temporal position of segments in two candidate segment classes is used for the stanza/refrain selection by means of a segment class designation means, wherein the highest-order segment class is designated as refrain segment class only when it has a segment following temporally later in the audio piece than the latest segment of the other candidate segment class. With this, segment class labeling with a low error rate is achieved, which can at the same time be implemented with easy effort and is further predestined for automated flow.

19 Claims, 8 Drawing Sheets

U.S. PATENT DOCUMENTS

| | | | | |
|---|---|---|---|---|
| 6,801,895 B1* | 10/2004 | Huang et al. | ............... | 704/270 |
| 6,915,009 B2* | 7/2005 | Foote et al. | ............... | 382/173 |
| 7,035,793 B2* | 4/2006 | Jiang et al. | ............... | 704/214 |
| 7,091,409 B2* | 8/2006 | Li et al. | ............... | 84/634 |
| 7,191,128 B2* | 3/2007 | Sall et al. | ............... | 704/233 |
| 2003/0048946 A1* | 3/2003 | Foote et al. | ............... | 382/173 |
| 2003/0083871 A1* | 5/2003 | Foote et al. | ............... | 704/233 |
| 2003/0161396 A1* | 8/2003 | Foote et al. | ............ | 375/240.01 |
| 2003/0231775 A1* | 12/2003 | Wark | ............... | 381/56 |
| 2003/0236661 A1* | 12/2003 | Burges et al. | ............... | 704/205 |
| 2004/0030547 A1* | 2/2004 | Leaning et al. | ............... | 704/211 |
| 2004/0064209 A1* | 4/2004 | Zhang | ............... | 700/94 |
| 2004/0074378 A1* | 4/2004 | Allamanche et al. | ......... | 84/616 |
| 2005/0005760 A1* | 1/2005 | Hull et al. | ............... | 84/645 |
| 2005/0016360 A1* | 1/2005 | Zhang | ............... | 84/600 |
| 2005/0055204 A1* | 3/2005 | Florencio et al. | ........... | 704/233 |
| 2005/0091062 A1* | 4/2005 | Burges et al. | ............... | 704/273 |
| 2005/0123053 A1* | 6/2005 | Cooper et al. | ......... | 375/240.24 |
| 2005/0238238 A1* | 10/2005 | Xu et al. | ............... | 382/224 |
| 2005/0241465 A1* | 11/2005 | Goto | ............... | 84/616 |
| 2005/0249080 A1* | 11/2005 | Foote et al. | ............... | 369/59.1 |
| 2006/0065102 A1* | 3/2006 | Xu | ............... | 84/600 |
| 2006/0205124 A1* | 9/2006 | Herner | ............... | 438/149 |
| 2006/0288849 A1* | 12/2006 | Peeters | ............... | 84/616 |

FOREIGN PATENT DOCUMENTS

| | | |
|---|---|---|
| EP | 1 577 877 | 10/2003 |
| JP | 2004/205575 A | 5/2003 |
| WO | WO 2004/038694 | 5/2004 |
| WO | WO 2004/049188 A1 | 10/2004 |

OTHER PUBLICATIONS

Written Opinion (in German) dated Jan. 19, 2006 for related applications, PCT/EP2005/00749.

International Search Report (In German) dated Jan. 19, 2006 for related application, PCT/EP2005/00749.

Cooper, M. et al., "Summarizing Popular Music Via Structural Similarity Analysis," Applications of Signal Processing to Audio and Acoustics, 2003 IEEE Workshop, Oct. 19-22, 2003, New Paltz, N.Y., pp. 127-130.

Logan, B. et al., "Music Summarization Using Key Phrases," Acoustics, Speech, and Signal Processing, 2000 IEEE International Conference, Jun. 5-9, 2000, Piscataway, N.J., pp. 749-752.

Bartsch, M. A. et al., "To Catch A Chorus: Using Chroma-Based Representations for Audio Thumbnailing," Applications of Signal Processing to Audio and Acoustics, 2001 IEEE Workshop, Oct. 21-24, 2001, Piscataway, N.J., pp. 15-18.

Wang, Muyuan et al., "Repeating Pattern Discovery from Acoustic Musical Signals," 2004 IEEE International Conference on Multimedia and Expo, Jun. 27, 2004, Piscataway, N.J., pp. 2019-2022.

Chai, Wei et al., "Structural Analysis of Musical Signals for Indexing and Thumbnailing," Proceedings 2003 Joint Conference on Digital Libraries, May 27, 2003, Piscataway, N.J., pp. 27-34.

*Music Summary Using Key Phrases*, Stephen Chu, Beth Logan, Cambridge Research Laboratory, Technical Report Series, CRL 2000/1, Apr. 2000.

*To Catch A Chorus: Using Chroma-Based Representations For Audio Thumbnailing*, Mark A. Bartsch, Gregory H. Wakefield, University of Michigan, EECS Department, Oct. 2001.

*Media Segmentation Using Self-Similarity Decomposition*, Jonathan T. Foote, Matthew L. Cooper. FX Palo Alto Laboratory.

*Summarizing Popular Music Via Strucutral Similarity Analysis*, Matthew Cooper, Jonathan Foote, 2003 IEEE Workshop on Applications of Signal Processing to Audio and Acoustics, Oct. 19-22, 2003.

*Automatic Music Summarization via Similarity Analysis*, Matthew Cooper, Jonathan Foote, FX Palo Laboratory, © 2002.

*Finding Repeating Patterns in Acoustic Musical Signals: Applciations for Audio Thumbnailing*, Jean-Julien Aucouturier, Mark Sandler, AES 22nd Int'l Conference on Virtual, Syunthetic and Entertainment Audio.

*Segmentation of Musical Signals Using Hidden Markov Models*, Jean-Julien Aucouturier, Mark Sandler, Department of Electronic Engineering, King's College, London, U.K., Audio Engineering Society, Convention Paper, 110th Convention May 12-15, 2001, Amsterdam, The Netherlands.

Kiranyaz, S.; Qureshi, A.F.; and Gabbouj, M.: "A Fuzzy Approach Towards Perceptual Classification And Segmentation Of MP3/AAC Audlo," IEEE 2004, pp. 727-730.

* cited by examiner

1st SEGMENT CLASS: 7, 4, 1
2nd SEGMENT CLASS: 5, 6
3rd SEGMENT CLASS: 10
4th SEGMENT CLASS: 2, 3

APPARATUS AND METHOD FOR DESIGNATING VARIOUS SEGMENT CLASSES

CROSS-REFERENCE TO RELATED APPLICATION

This application claims priority from German Patent Application No. 102004047032.4, which was filed on Sep. 28, 2004, and is incorporated herein by reference in its entirety.

BACKGROUND OF THE INVENTION

1. Field of the Invention

The present invention relates to the audio segmentation and in particular to the analysis of pieces of music, to the individual main parts contained in the pieces of music, which may repeatedly occur in the piece of music.

2. Description of the Related Art

Music from the rock and pop area mostly consists of more or less unique segments, such as intro, stanza, refrain, bridge, outro, etc. It is the aim of the audio segmentation to detect the starting and end time instants of such segments and to group the segments according to their membership in the most important classes (stanza and refrain). Correct segmentation and also characterization of the calculated segments may be sensibly employed in various areas. For example, pieces of music from online providers, such as Amazon, Musicline, etc., may be intelligently "intro scanned".

Most providers on the Internet limit themselves to a short excerpt from the pieces of music offered in their listening examples. In this case it would of course also make sense to offer the person interested not only the first 30 seconds or any 30 seconds but a most representative excerpt from the song. This could for example be the refrain or a summary of the song, consisting of segments belonging to the various main classes (stanza, refrain, . . . ).

A further example of application for the technique of the audio segmentation is integrating the segmentation/grouping/marking algorithm into a music player. The information on segment beginnings and segment ends enables targeted navigating through a piece of music. By the class membership of the segments, i.e. whether a segment is a stanza, a refrain, etc., it can for example also be possible to jump directly to the next refrain or to the next stanza. Such an application is of interest for large music markets offering their customers the possibility to listen into complete albums. Thereby, the customer can do without the troublesome, searching fast-forwarding to characteristic parts in the song, which might make him in fact buy a piece of music in the end.

In the field of the audio segmentation, various approaches exist. Subsequently, the approach of Jonathan Foote and Matthew Cooper is exemplarily illustrated. This method is illustrated in FOOTE, J. T./Cooper, M. L.: *Summarizing Popular Music via Structural Similarity Analysis.* Proceedings of the IEEE Workshop of Signal Processing to Audio and Acoustics 2003. FOOTE, J. T./COOPER, M. L.: *Media Segmentation using Self-Similar Decomposition.* Proceedings of SPIE Storage and Retrieval for Multimedia Databases, Vol. 5021, pp. 167-75, January 2003.

The known method of Foote is exemplarily explained on the basis of the block circuit diagram of FIG. 5. At first, a WAV file 500 is provided. In a downstream extraction block 502, feature extraction takes place, wherein the spectral coefficients as such or alternatively the mel frequency cepstral coefficients (MFCCs) are extracted as feature. Before this extraction, a short-time Fourier transform (STFT) with 0.05 seconds wide non-overlapping windows is performed with the WAV file. The MFCC features are then extracted in the spectral region. Here, it is to be pointed out that the parameterization is not optimized for compression, transfer, or reconstruction, but for audio analysis. There is a requirement in that similar audio pieces generate similar features.

The extracted features are then filed in a memory 504.

Upon the feature extraction algorithm, now a segmentation algorithm takes place, which ends in a similarity matrix, as it is illustrated in block 506. At first, however, the feature matrix is read (508) in order to then group feature vectors (510) in order to then construct a similarity matrix consisting of a distance measurement between all features, respectively, due to the grouped feature vectors. In detail, all paired combinations of audio windows are compared using a quantitative similarity measure, i.e. the distance.

The construction of the similarity matrix is illustrated in FIG. 8. In FIG. 8 the piece of music is illustrated as stream 800 of audio samples. The audio piece is, as has been detailed, windowed, wherein a first window is designated with i and a second window with j. Altogether, the audio piece has K windows, for example. This means that the similarity matrix has K rows and K columns. Then for each window i and for each window j a similarity measure to each other is calculated, wherein the calculated similarity measure or distance measure $D(i,j)$ is input at the row or column designated by i and j, respectively, in the similarity matrix. A column thus shows the similarity of the window designated by j to all other audio windows in the piece of music. The similarity of the window j to the very first window of the piece of music would then be in the column j and in the row 1. The similarity of the window j to the second window of the piece of music would then be in the column j, but now in row 2. On the other hand, the similarity of the second window to the first window would be in the second column of the matrix and in the first row of the matrix.

It can be seen that the matrix is redundant in that it is symmetrical to the diagonal and that on the diagonal there is the similarity of the window to itself, which illustrates the trivial case of 100% similarity.

An example for a similarity matrix of a piece can be seen in FIG. 6. Here again, the completely symmetrical structure of the matrix with reference to the main diagonal can be recognized, wherein the main diagonal can be seen as a bright strip. Furthermore, it is pointed out that due to the small window lengths in comparison with the relatively rough time resolution, in FIG. 6 the main diagonal is not seen as a bright continuous line, but is only about recognizable from FIG. 6.

Hereupon, using the similarity matrix, as it is illustrated for example in FIG. 6, a kernel correlation 512 with a kernel matrix 514 is performed to obtain a novelty measure, which is also known as "novelty score", and which could be averaged and is illustrated in smoothened form in FIG. 9. The smoothing of this novelty score is schematically illustrated in FIG. 5 by a block 516.

Hereupon, in a block 518 the segment boundaries are read out using the smoothened novelty value course, wherein local maxima in the smoothened novelty course have to be determined and, if required, shifted by a constant number of samples caused by the smoothing for this, in order to in fact obtain the correct segment boundaries of the audio piece as absolute or relative time indication.

Hereupon, as it can already be seen from FIG. 5 in a block designated with clustering, a so-called segment similarity representation or segment similarity matrix 520 is established. An example for a segment similarity matrix 520 is illustrated in FIG. 7. The similarity matrix in FIG. 7 in principle is similar to the feature similarity matrix of FIG. 6, wherein now, however, features from windows, as in FIG. 6, are no longer used, but features from a whole segment. The segment similarity matrix has a meaning similar to the feature similarity matrix, but with a substantially rougher resolution, which is, of course, desired when considering that window lengths lie in the range of 0.05 seconds, whereas reasonably long segments lie in the range of maybe 10 seconds of a piece.

Hereupon, in a block 522, then clustering is performed, i.e. a classification of the segments into segment classes (a classification of similar segments into the same segment class), in order to then mark the segment classes found in a block 524, which is also designated as "labeling". In the labeling, it is determined which segment class contains segments that are stanzas, that are refrains, that are intros, outros, bridges, etc.

Finally, in a block designated with 526 in FIG. 5, a music summary is established, which may for example be provided to a user in order to hear only e.g. a stanza, a refrain and the intro of a piece without redundancy.

Subsequently, it will be gone into the individual blocks in still greater detail.

As has already been explained, the actual segmentation of the piece of music takes place only when the feature matrices are generated and stored (block 504).

Subject to on the basis of which feature the piece of music is to be examined regarding its structure, the corresponding feature matrix is read out and loaded into a working memory for further processing. The feature matrix has the dimension of number of the analysis window by number of feature coefficients.

By the similarity matrix, the feature course of a piece is brought into a two-dimensional representation. For each paired combination of feature vectors, the distance measure is calculated, which is kept in the similarity matrix. For the calculation of the distance measure between two vectors, there are various possibilities, namely for example the Euclidean distance measurement and the cosine distance measurement. A result D(i,j) between the two feature vectors is stored in the i, j$^{th}$ element of the window similarity matrix (block 506). The main diagonal of the similarity matrix represents the course of the entire piece. Accordingly, the elements of the main diagonal result from the respective comparison of a window with itself and always have the value of the greatest similarity. In the cosine distance measurement, this is the value 1, in the simple scalar difference and the Euclidean distance this value equals 0.

For the visualization of a similarity matrix as it is illustrated in FIG. 6, each element i, j is assigned a gray scale. The gray scales are graded proportionally to the similarity values, so that the maximum similarity (the main diagonal) corresponds to the maximum similarity. By this illustration, the structure of a song may already be recognized optically due to the matrix. Regions of similar feature expression correspond to quadrants of similar brightness along the main diagonal. It is the task of the actual segmentation to find the boundaries between the regions.

The structure of the similarity matrix is important for the novelty measure calculated in the kernel correlation 512. The novelty measure develops by the correlation of a special kernel along the main diagonal of the similarity matrix. An exemplary kernel K is illustrated in FIG. 5. If this kernel matrix is correlated along the main diagonal of the similarity matrix S, and all products of the overlying matrix elements for each time instant i of the piece are summed, the novelty measure is obtained, which is exemplarily illustrated in smoothened form in FIG. 9. Preferably, not the kernel K is used in FIG. 5, but an enlarged kernel, which is additionally overlaid with a Gaussian distribution, so that the edges of the matrix move toward 0.

The selection of the prominent maxima in the novelty course is important for the segmentation. The selection of all maxima of the un-smoothened novelty course would lead to a strong over-segmentation of the audio signal.

Therefore, the novelty measure should be smoothened, namely with various filters, such as IIR filters or FIR filters.

If the segment boundaries of a piece of music are extracted, now similar segments have to be characterized as such and grouped in classes.

Foote and Cooper describe the calculation of a segment-based similarity matrix by means of a Cullback-Leibler distance. For this, on the basis of the segment boundaries acquired from the novelty course, individual segment feature matrices are extracted from the entire feature matrix, i.e. each of these matrices is a sub-matrix of the entire feature matrix. The segment similarity matrix 520 thus developed is now subjected to a singular value decomposition (SVD). Hereupon, singular values in decreasing order are obtained.

In block 526, then an automatic summary of a piece is performed on the basis of the segments and the clusters of a piece of music. For this, at first the two clusters with the greatest singular values are selected. Then the segment with the maximum value of the corresponding cluster indicator is added to this summary. This means that the summary includes a stanza and a refrain. Alternatively, also all repeated segments may be removed to ensure that all information of the piece is provided, but always exactly once.

With reference to further techniques for the segmentation/music analysis it is referred to CHU, S./LOGAN B.: *Music Summary using Key Phrases*. Technical Report, Cambridge Research Laboratory 2000, BARTSCH, M. A./WAKE-FIELD, G. H.: To Catch a Chorus: *Using Chroma-Based Representation for Audio Thumbnailing*. Proceedings of the IEEE Workshop of Signal Processing to Audio and Acoustics 2001. http://musen.engin.umich.edu/papers/bartsch wakefield waspaa01 final.pdf.

It is disadvantageous in the known method that the singular value decomposition (SVD) for segment class formation, i.e. for assigning segments to clusters, on the one hand is very computing-intensive, and on the other hand problematic in the judgement of the results. When the singular values are about equally large, a potentially wrong decision is taken in that the two similar singular values actually represent the same segment class and not two different segment classes.

Furthermore, it has been found out that the results obtained by the singular value decomposition become more and more problematic when there are strong similarity value differences, i.e. when a piece contains very similar portions, like stanza and refrain, but also relatively dissimilar portions, like intro, outro or bridge.

It is further problematic in the known method that it is always assumed that the cluster among the two clusters with the highest singular values, which has the first segment in the song, is the cluster "stanza" and that the other cluster is the cluster "refrain". This procedure is based on assuming, in the known method, that a song always begins with a stanza. Experience has shown that significant labeling errors are obtained with this. This is problematic in so far as the labeling is, as it were, the "harvest" of the entire method, i.e. what the user gets to know immediately. Even if the preceding steps have been precise and intensive, everything becomes relative when at the end it is labeled wrongly, since then the trust of the user in the entire concept could suffer altogether.

At this point it is to be pointed out that in particular there is need for automatic music analysis methods, without always being able to examine and, if necessary, correct the result. Instead a method is only employable in the market when it can run automatically without any human post-correction.

The known concept is particularly problematic and error-prone in labeling, when e.g. the last segment of the presumed stanza segment class is at the same time the last segment of the audio piece. Then it is very likely that an error has been made, because an audio piece seldom ends with a stanza.

Furthermore, the segment class designation on the basis of the absolute values of the singular values is problematic when there are two singular values having relatively similar values, or when there is even a dominant singular value, but also a second and a third singular value that both have a great distance to the first singular value but have a small distance between each other. At this point, quality penalties in labeling have to be accepted, which in the end may result in the refrain being designated as stanza and the stanza being designated as refrain, or maybe a bridge relatively similar to the solo or the intro/outro being designated as refrain, whereas the actual refrain is not recognized as such.

SUMMARY OF THE INVENTION

It is the object of the present invention to provide an enhanced and at the same time efficient-to-implement concept for designating various segment classes.

In accordance with a first aspect, the present invention provides an apparatus for designating several segment classes to which temporal segments are assigned due to segment similarities, wherein the segments represent an audio piece, which is structured into main parts repeatedly occurring in the audio piece, having: a provider for providing a representation of the audio piece, in which the segments of the audio piece are assigned to various segment classes, wherein one segment class each can be associated with a main part; and a segment class designator formed to perform the main part selection for a first first-order candidate segment class and for a second second-order candidate segment class, wherein the second order is lower than the first order regarding a similarity of segments of the second candidate segment class to segments of the audio piece, examine whether the first-order candidate segment class has the temporally later segment in the audio signal, and designate the first-order candidate segment class as refrain segment class when it has the temporally later segment and to designate the second-order candidate segment class as stanza segment class.

In accordance with a second aspect, the present invention provides a method of designating various segment classes, to which temporal segments are assigned due to segment similarities, wherein the segment similarities are assigned, wherein the segments represent an audio piece that is structured into main parts repeatedly occurring in the audio piece, with the steps of: providing a representation of the audio piece, in which the segments of the audio piece are assigned to various segment classes, wherein one segment class each can be associated with a main part, and designating the segment classes by performing the main part selection for a first first-order candidate segment class and for a second second-order candidate segment class, wherein the second order is lower than the first order regarding a similarity of the segments of the second candidate segment class to segments of the audio piece, by examining whether a first-order candidate segment class has the temporally later segment in the audio signal, and by designating the first-order candidate segment class as refrain segment class, when it has the temporally later segment, and designating the second-order candidate segment class as stanza segment class.

In accordance with a third aspect, the present invention provides a computer program for executing, when the computer program is executed on a computer, a method of designating various segment classes, to which temporal segments are assigned due to segment similarities, wherein the segment similarities are assigned, wherein the segments represent an audio piece that is structured into main parts repeatedly occurring in the audio piece, with the steps of: providing a representation of the audio piece, in which the segments of the audio piece are assigned to various segment classes, wherein one segment class each can be associated with a main part, and designating the segment classes by performing the main part selection for a first first-order candidate segment class and for a second second-order candidate segment class, wherein the second order is lower than the first order regarding a similarity of the segments of the second candidate segment class to segments of the audio piece, by examining whether a first-order candidate segment class has the temporally later segment in the audio signal, and by designating the first-order candidate segment class as refrain segment class, when it has the temporally later segment, and designating the second-order candidate segment class as stanza segment class.

The present invention is based on the finding that for the main part selection between at least two candidate segment classes, an examination of the temporal positions of segments in the two candidate segment classes yields a segment class designation or a segment class labeling with a low error rate. In particular, it has been found out that the segment class from the two stanza/refrain candidate classes that has a segment occurring later in the course of the song than all segments of the other candidate segment class, is the refrain segment class in almost every case. The inventive designation of segment classes by examining the latest segment of the two segment classes and by designating the segment class as refrain segment class, which has the last segment of both classes in the course of the song.

The access to temporal positions of one or more segments in one or more segment classes only means small additional effort, because the segments in the classes are present together with their temporal positions anyway. The segment class designation is thus substantially enhanced by few queries or comparisons regarding the temporal position of one or more segments in the first candidate segment class and the second candidate segment class, because in the inventive assignment general findings about structures of pieces of music may be taken into account.

The inventive concept based on the use of the segment information of the candidate segment classes also avoids hard-to-decide situations, as they occur for example when similarly great singular values occur in the prior art. For the segment designation on the basis of the temporal positions of segments in the candidate segment classes there is always a clear response, since a segment by definition will always have a unique temporal excerpt of the piece of music and will thus have a relation to the piece of music or to another segment, which will either be the last segment, the first segment, before the other segment, or after the other segment. Hard-to-decide states do not exist here. Also for this reason the inventive concept can be efficiently implemented and is also particularly well suited for automated implementation.

At this point it is to be pointed out that in particular the automating capability is necessary for large-volume application of the inventive concept or in general the music analysis on the basis of segmentation. This is due to the fact that the main application is to be seen always in connection with large music databases and thus the processing of significant amounts of data, which in many cases can only be handled by automated algorithm processing.

In one embodiment, the assignment of a segment to a segment class takes place on the basis of an adaptive similarity mean value for a segment, such that by the similarity mean value it is taken into account which overall similarity score a segment has in the entire piece. After such a similarity mean value has been calculated for a segment, for the calculation of which the number of segments and the similarity values of the plurality of similarity values associated with the segment are required, the actual assignment of a segment to a segment class, i.e. to a cluster, is then performed on the basis of this similarity mean value. If a similarity value of a segment to the segment just considered for example lies above the similarity mean value, the segment is assigned as belonging to the segment class just considered. If the similarity value of a segment to the segment just considered, however, lies below this similarity mean value, it is not assigned to the segment class.

In other words, this means that the assignment is no longer performed depending on the absolute quantity of the similarity values, but relative to the similarity mean value. This means that, for a segment having a relatively low similarity score, i.e. for example for a segment having an intro or outro, the similarity mean value will be lower than for a segment that is a stanza or a refrain. With this, the strong deviations of the similarities from segments in pieces or the frequency of occurrence of such segments in pieces are taken into account, wherein e.g. numerical problems and thus also ambiguities and wrong assignments connected therewith can be avoided.

The inventive concept is particularly suited for pieces of music that do not only consist of stanzas and refrains, i.e. that have segments belonging to segment classes having equally large similarity values, but also for pieces having parts other than stanza and refrain, namely an intro, a bridge or an outro.

In a preferred embodiment of the present invention, the calculation of the adaptive similarity mean value and the assigning of a segment are performed iteratively, wherein the similarity values of assigned segments are ignored in the next iteration pass. For the next iteration pass, another similarity absolute value may be the maximum, since already assigned segments (i.e. also earlier maximums) have been set to 0.

In a preferred embodiment of the present invention, a segmentation post-correction is performed, namely in that after the segmentation e.g. due to the novelty value (of the local maxima of the novelty value) and after an ensuing association with segment classes relatively short segments are examined to see whether they can be associated with the predecessor segment or the successor segment, because segments below a minimum segment length are very likely to point to over-segmentation.

In an alternative preferred embodiment of the present invention, after the final segmentation and association into the segment classes, labeling is performed, namely using a special selection algorithm in order to obtain a characterization as correct as possible of the segment classes as stanza or refrain.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
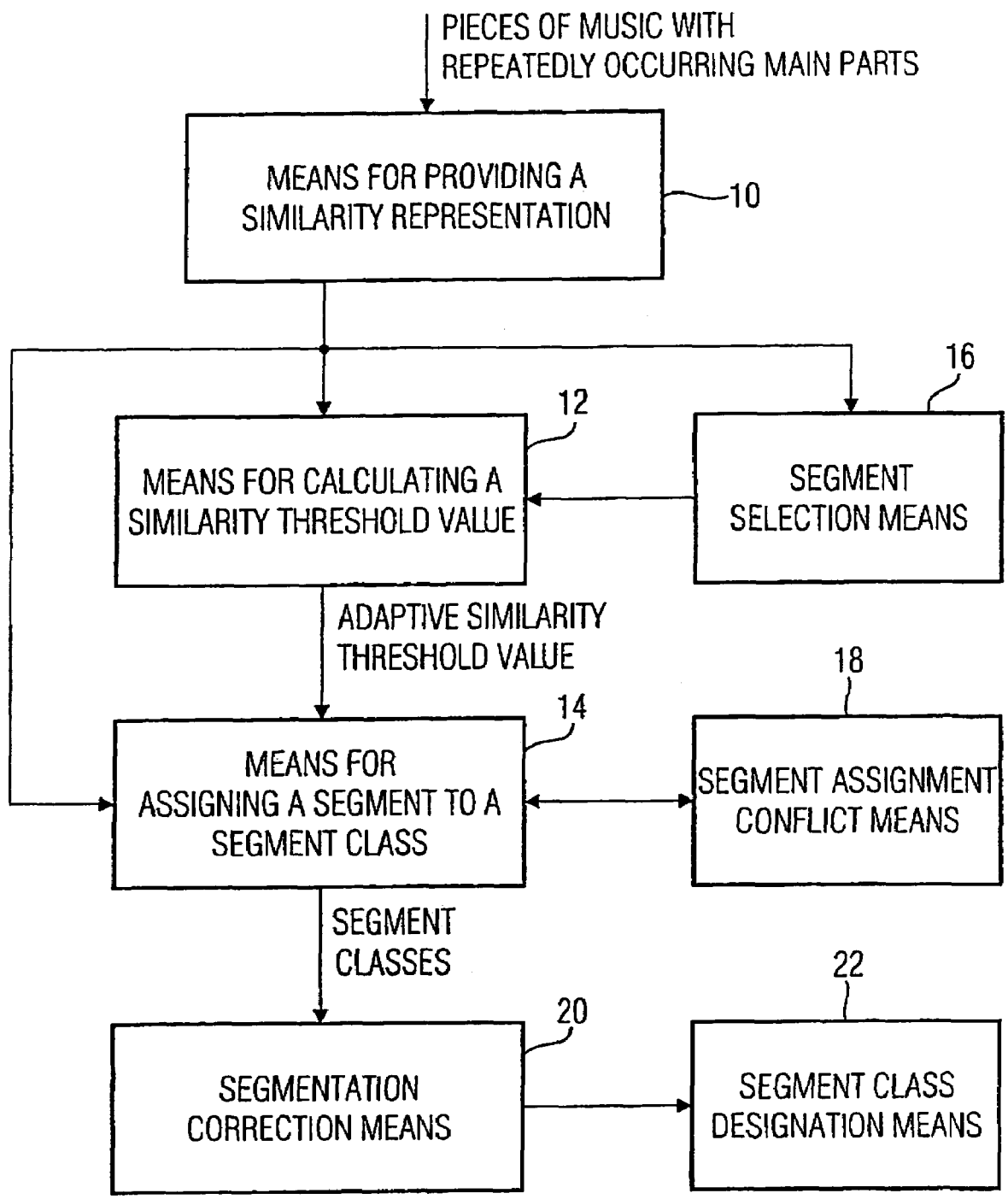
FIG. 1 is a block circuit diagram of the inventive apparatus for grouping according to a preferred embodiment of the present invention.

FIG. 1 shows an apparatus for grouping temporal segments of a piece of music, which is structured into main parts repeatedly occurring in the piece of music, into different segment classes, wherein a segment class is associated with a main part. The present invention thus particularly relates to pieces of music subject to a certain structure, in which similar sections appear several times and alternate with other sections. Most rock and pop songs have a clear structure referring to their main parts.

The literature treats the topic of music analysis mainly on the basis of classical music, of which however also a lot applies to rock and pop music. The main parts of a piece of music are also called "large form parts". By a large form part of a piece, a section is understood which has a relatively uniform nature regarding various features, e.g. melody, rhythm, texture, etc. This definition generally applies in the music theory.

Large form parts in rock and pop music are for example stanza, refrain, bridge, and solo. In classical music, an interplay of refrain and other parts (couplets) of a composition is also called rondo. In general, the couplets contrast the refrain, for example regarding melody, rhythm, harmony, key, or instrumentation. This can also be transferred to modern entertainment music. Like there are various forms in the rondo (chain rondo, arc rondo, sonata rondo), in rock and pop music there are also proven patterns for the construction of a song. These are of course only some possibilities out of many. In the end, of course, the composer decides how his piece is constructed.

An example for a typical construction of a rock song is the pattern:

A-B-A-B-C-D-A-B, wherein A equals stanza, B equals refrain, C equals bridge, and D equals solo applies. Often a piece of music is introduced by an intro. Intros often consist of the same chord sequence as the stanza, but with other instrumentation, e.g. without drums, without bass, or without distortion of the guitar in rock song, etc.

Figure 7:
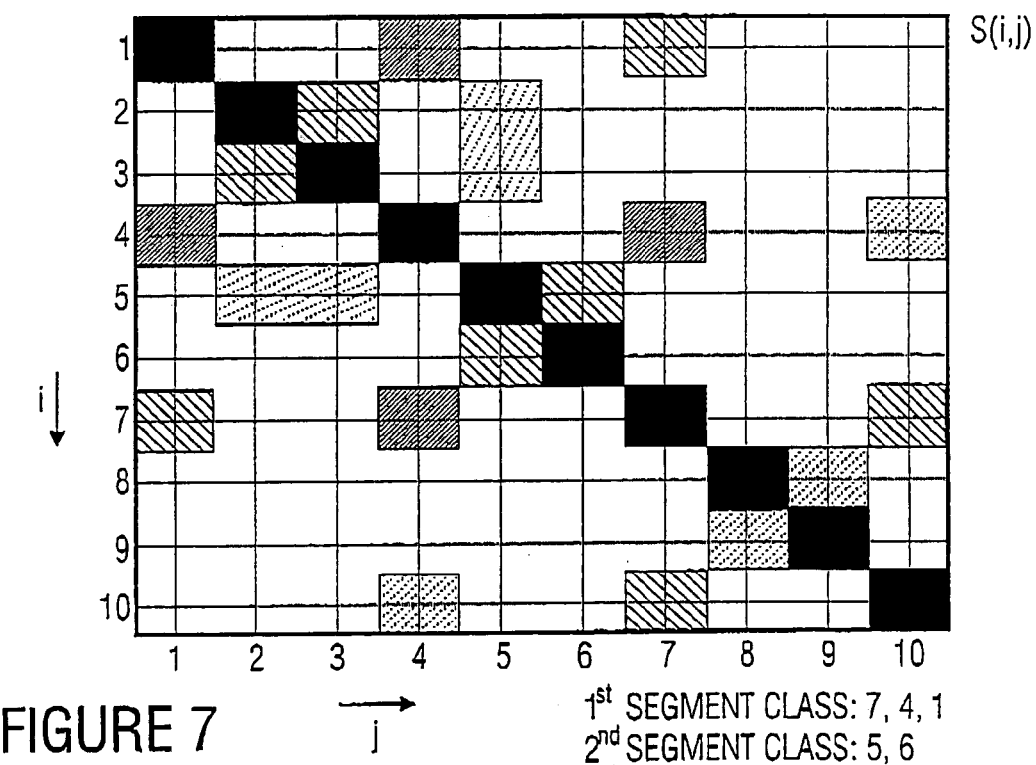
FIG. 7 is an exemplary illustration of a segment similarity matrix.
Figure 8:
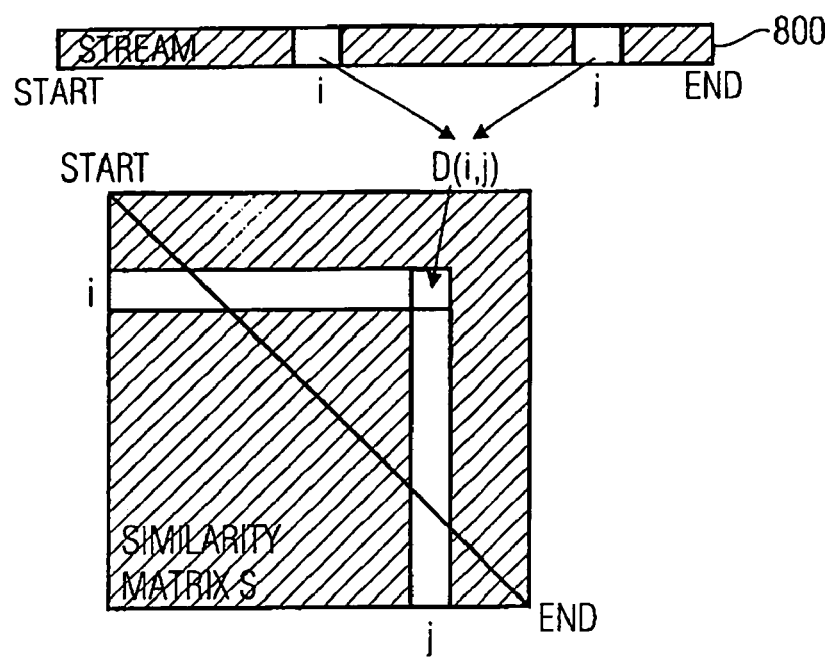
FIG. 8 is a schematic illustration for illustrating the elements in a similarity matrix S.

The inventive apparatus at first includes means 10 for providing a similarity representation for the segments, wherein the similarity representation for each segment comprises an associated plurality of similarity values, wherein the similarity values indicate how similar the segment is to each other segment. The similarity representation is preferably the segment similarity matrix shown in FIG. 7. For each segment (in FIG. 7 segments 1-10), it has a column of its own, which has the index "j". Furthermore, the similarity representation for each segment has a row of its own, wherein a row is designated with a row index i. Subsequently, this is designated on the basis of the exemplary segment 5. The element (5,5) in the main diagonal of the matrix of FIG. 7 is the similarity value of the segment 5 to itself, i.e. the maximum similarity value. Furthermore, the segment 5 is also fairly similar to the segment No. 6, as it is designated by the element (6,5) or by the element (5,6) of the matrix in FIG. 7. Moreover, segment 5 also has similarities to the segments 2 and 3, as it is shown by the elements (2,5) or (3,5) or (5,2) or (5,3) in FIG. 7. To the other segments 1, 4, 7, 8, 9, 10, the segment No. 5 has a similarity that it no longer visible in FIG. 7.

A plurality of similarity values associated with the segment is for example a column or a row of the segment similarity matrix in FIG. 7, wherein this column or row, due to its column/row index, indicates to which segment it refers, namely for example to the fifth segment, and wherein this row/column includes the similarities of the fifth segment to each other segment in the piece. The plurality of similarity values thus is for example a row of the similarity matrix or, alternatively, a column of the similarity matrix of FIG. 7.

The apparatus for grouping temporal segments of the piece of music further includes means 12 for calculating a similarity mean value for a segment using the segments and the similarity values of the plurality of similarity values associated with the segment. Means 12 is formed, for example, to calculate a similarity mean value for the column 5 in FIG. 7. If in a preferred embodiment the arithmetic mean value is used, means 12 will add the similarity values in the column and divide them by the number of the segments altogether. In order to eliminate the self-similarity, also the similarity of the segment to itself could be subtracted from the addition result, wherein of course then also a division is no longer to be made by all elements but only by all elements less 1.

Means 12 for calculating could alternatively also calculate the geometric mean value, i.e. square each similarity value of a column for itself to sum squared results in order to then calculate a root from the summation result, which is to be divided by the number of elements in the column (or the number of elements in the column less 1). Arbitrary other mean values, such as the median value, etc., can be used as long as the mean value for each column of the similarity matrix is calculated adaptively, i.e. is a value calculated using the similarity values of the plurality of similarity values associated with the segment.

The adaptively calculated similarity threshold value is then provided to means 14 for assigning a segment to a segment class. Means 14 for assigning is formed to associate a segment with a segment class when the similarity value of the segment class meets a predetermined condition referring to the similarity mean value. For example, if the similarity mean value is such that a greater value indicates greater similarity and a smaller value lower similarity, the predetermined relation will be that the similarity value of a segment has to be equal to or above the similarity mean value, so that the segment is assigned to a segment class.

In a preferred embodiment of the present invention, still further means exist to realize special embodiments which will be gone into later. These means are segment selection means 16, segment assignment conflict means 18, segmentation correction means 20 as well as a segment class designation means 22.

The segment selection means 16 in FIG. 1 is formed to at first calculate, for each column in the matrix of FIG. 7, an overall similarity value V(j), which is determined as follows:

$$V(j) = \sum_{i=1}^{P} S_s(i, j) - SS \quad j = 1, K, P$$

P is the number of segments. SS is the value of the self-similarity of a segment to itself. Depending on the technology used, the value may for example be zero or one. The segment selection means 16 will at first calculate the value V(j) for each segment in order to then find out the vector element i of the vector V with maximum value. In other words, this means that the column in FIG. 7 is chosen that reaches the greatest value or score in the addition of the individual similarity values in the column. This segment could for example be the segment No. 5 or the column 5 of the matrix in FIG. 7, because this segment has at least some similarity with three other segments. Another candidate in the example of FIG. 7 could also be the segment with the No. 7, because this segment also has some similarity to three other segments, which is, in addition, even greater than the similarity of the segment 5 to the segments 2 and 3 (higher gray shading in FIG. 7).

For the following example it is now assumed that the segment selection means 16 selects the segment No. 7, because it has the highest similarity score due to the matrix elements (1,7), (4,7) and (10,7). In other words, this means that V(7) is the component of the vector V having the maximum value among all components.

Now the similarity score of the column 7, i.e. for the segment No. 7, is divided by the number "9" in order to obtain the similarity threshold value for the segment from means 12.

In the segment similarity matrix, it is hereupon examined, for the seventh row or column, which segment similarities lie above the calculated threshold value, i.e. with which segments the $i^{th}$ segment has an above-average similarity. All these segments are now assigned to a first segment class just like the seventh segment.

For the present example it is assumed that the similarity of the segment 10 to the segment 7 is below average, but that the similarities of the segment 4 and the segment 1 to the segment 7 are above average. Apart from the segment No. 7, also the segment No. 4 and the segment No. 1 are thus classified into the first segment class. On the other hand, the segment No. 10 is not classified into the first segment class due to the below-average similarity to the segment No. 7.

After the assignment the corresponding vector elements V(j) of all segments that were associated with a cluster in this threshold value examination are set to 0. In the example, these are, apart from V(7), also the components V(4) and V(1). This immediately means that the $7^{th}$, $4^{th}$, and $1^{st}$ column of the matrix would no longer be available for a later maximum search since they are zero, i.e. cannot be a maximum at all.

This is equal in meaning to the fact that the entries (1,7), (4,7), (7,7), and (10,7) of the segment similarity matrix are set to zero. The same procedure is performed for the column 1 (elements (1,1), (4,1), and (7,1)) and the column 4 (elements (1,4), (4,4), (7,4), and (10,4)). Due to the easier handling capability, the matrix is, however, not changed, but the components of V belonging to an assigned segment are ignored in the next maximum search in a later iteration step.

In a next iteration step, now a new maximum is searched for among the still remaining elements of V, i.e. among V(2), V(3), V(5), V(6), V(8), V(9), and V(10). It is anticipated that the segment No. 5, i.e. V(5) will then yield the greatest similarity score. The second segment class then gets the segments 5 and 6. Due to the fact that the similarities to the segments 2 and 3 are below average, the segments 2 and 3 are not brought in the second-order cluster. With this, the elements V(6) and V(5) of the vector V are set to 0 due to the assignment that took place, while the components V(2), V(3), V(8), V(9), and V(10) of the vector still remain for the selection of the third-order cluster.

Hereupon a new maximum is again searched for among the remaining elements of V mentioned. The new maximum could be V(10), i.e. the component of V for the segment 10. Segment 10 thus goes into the third-order segment class. Furthermore, it could turn out that the segment 7 also has above-average similarity to the segment 10, although the segment 7 is already characterized belonging to the first segment class. Thus, an assignment conflict arises, which is resolved by the segment assignment conflict means 18 of FIG. 1.

A simple way of the resolution could be to simply not assign the segment 7 into the third segment class and, for example, instead assign the segment 4, if not also a conflict existed for the segment 4.

Preferably however, in order not to disregard the similarity between the segment 7 and the segment 10, the similarity between 7 and 10 is taken into account in the following algorithm.

In general, the invention is adapted not to disregard the similarity between i and k. Hence, the similarity values $S_S(i,k)$ of the segments i and k are compared with the similarity value $S_S(i^*,k)$, wherein $i^*$ is the first segment associated with the cluster $C^*$. The cluster or segment class $C^*$ is the cluster with which the segment k is already associated due to a previous examination. The similarity value $S_S(i^*,k)$ is decisive for the fact that the segment k belongs to the cluster $C^*$. If $S_S(i^*,k)$ is greater than $S_S(i,k)$, the segment k remains in the cluster $C^*$. If $S_S(i^*,k)$ is smaller than $S_S(i,k)$, the segment k is taken out of the cluster $C^*$ and assigned to the cluster C. For the first case, i.e. when the segment k does not change cluster membership, a tendency to the cluster $C^*$ is noted for the segment i. Preferably, this tendency, however, is noted also when the segment k changes the cluster membership. In this case a tendency of this segment to the cluster into which it was originally received is noted. These tendencies may advantageously be used in a segmentation correction, which is executed by the segmentation correction means 20.

The similarity value examination will result in favor of the first segment class due to the fact that the segment 7 is the "original segment" in the first segment class. The segment 7 will thus not change its cluster membership (segment membership), but it will remain in the first segment class. This fact is, however, taken into account by certifying a trend to the first segment class for the segment No. 10 in the third segment class.

According to the invention, it is taken into account with this that particularly for the segments the segment similarities of which exist to two different segment classes these similarities, however, are not ignored but are still taken into account, as required, later by the trend or the tendency.

The procedure is continued until all the segments in the segment similarity matrix are associated, which is the case when all elements of vector V are set to zero.

Figure 2:
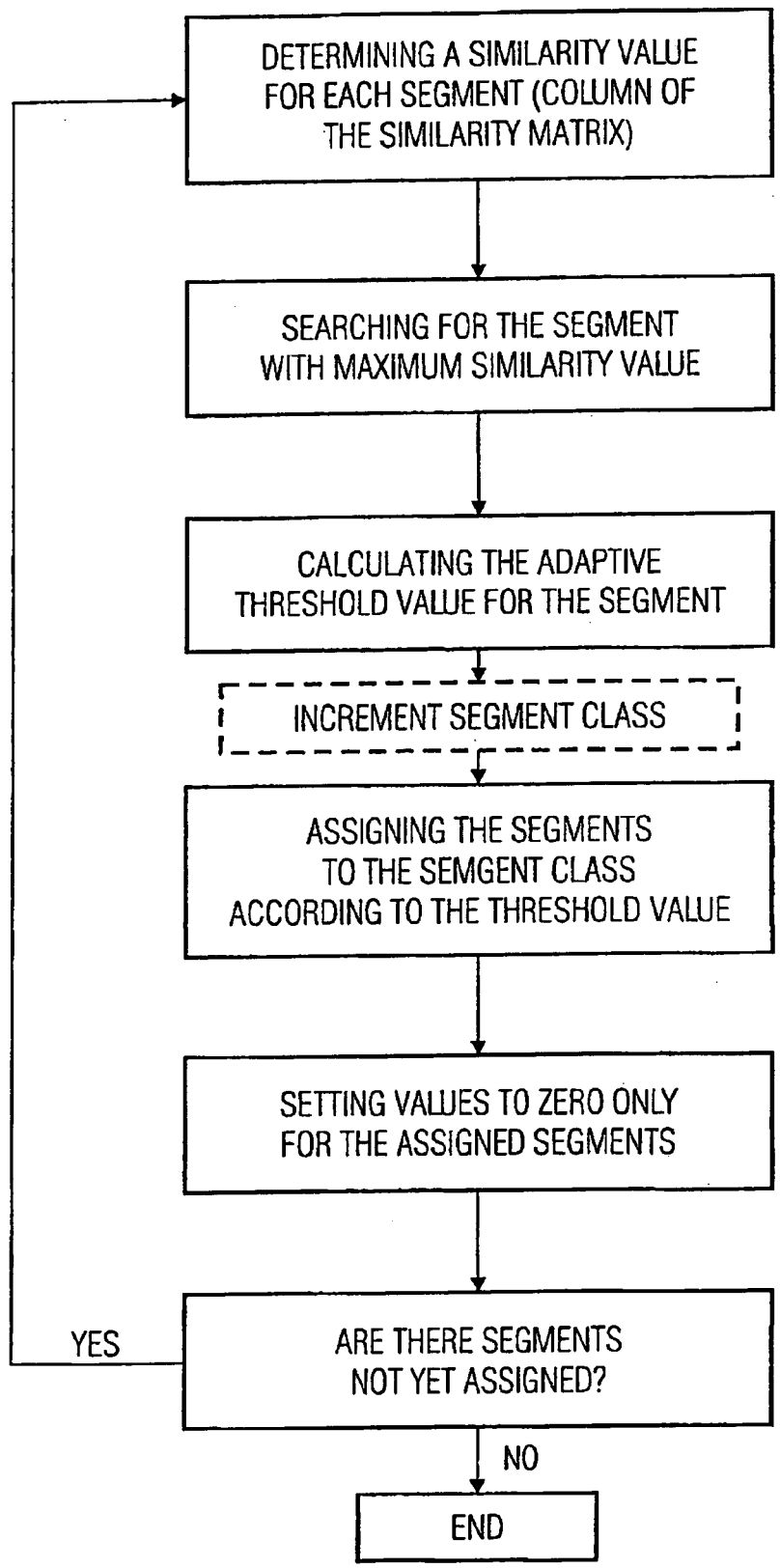
FIG. 2 is a flow chart for the illustration of a preferred embodiment of the invention for iteratively assigning.

For the example shown in FIG. 7, this would mean that the maximum of V(2), V(3), V(8), V(9), i.e. the segments 2 and 3, is classified next into the fourth segment class in order to then classify these segments 8 or 90 in a fifth segment class, until all the segments have been associated. With this, the iterative algorithm shown in FIG. 2 is completed.

In the following, the preferred implementation of the segmentation correction means 20 is gone into in detail on the basis of FIG. 3.

It can be seen that in the calculation of the segment boundaries by means of the kernel correlation, but also in the calculation of segment boundaries by means of other measures, often an over-segmentation of a piece arises, i.e. too many segment boundaries or generally too short segments are calculated. An over-segmentation, for example induced by wrong subdivision of the stanza, is inventively corrected by correcting due to the segment length and the information into which segment class a predecessor or successor segment has been sorted. In other words, the correction serves to completely eliminate short segments, i.e. merge them with adjacent segments, and to subject segments which are short but not too short, i.e. which have a short length but are longer than the minimum length, to a special examination whether maybe they could indeed be merged with a predecessor segment or a successor segment. Basically, according to the invention, successive segments belonging to the same segment class are always merged. If the scenario shown in FIG. 7 yields e.g. that the segments 2 and 3 go into the same segment class, they are automatically merged with each other, while the segments in the first segment class, i.e. the segments 7, 4, 1 are spaced apart from each other and are thus (at least at first) not mergeable. This is hinted at in FIG. 3 by a block 30. In a block 31, it is now examined whether segments have a segment length smaller than a minimum length. Thus, preferably various minimum lengths exist.

Only relatively short segments, which are shorter than 11 seconds (a first threshold), are examined at all, whereas later still shorter segments (a second threshold smaller than the first), which are shorter than 9 seconds, are examined, and later still remaining segments, which are shorter than 6 seconds (a third threshold shorter than the second threshold), are again treated alternatively.

In the preferred embodiment of the present invention, in which this staggered length examination takes place, the segment length examination in block 31 is first directed to finding the segments shorter than 11 seconds. For the segments that are longer than 11 seconds no post-processing is made, as it is recognizable by a "no" at the block 31. For segments shorter than 11 seconds at first a tendency examination (block 32) is performed. At first it is examined whether a segment has an associated trend or an associated tendency due to the functionality of the segment assignment conflict means 18 of FIG. 1. In the example of FIG. 7, this would be the segment 10, which has a trend to segment 7 or a trend to the first segment class. If the tenth segment is shorter than 11 seconds, in the example shown in FIG. 7, due to the tendency examination, nothing would happen however, since merging the considered segment only takes place when it has a tendency not to any cluster, i.e. to any segment class, but a tendency to a cluster of an adjoining segment (before or after). This is not the case, however, for the segment 10 in the example shown in FIG. 7.

Figure 3:
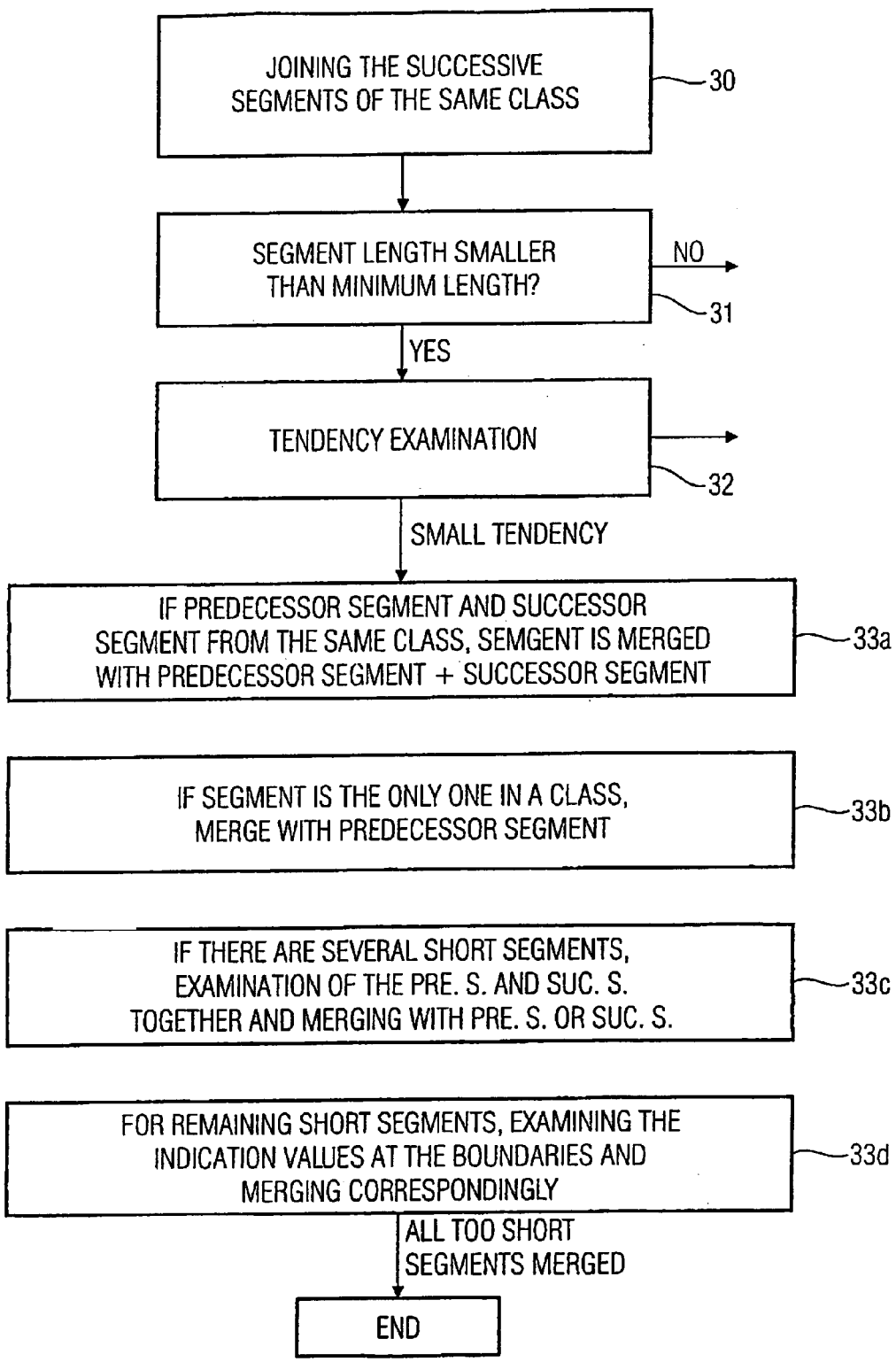
FIG. 3 is a block diagram of the functioning of the segmentation correction means.

In order to also avoid the too short segments having no tendency to the cluster of an adjacent segment, the procedure is as illustrated in blocks 33a, 33b, 33c, and 33d in FIG. 3. On segments longer than 9 seconds, but shorter than 11 seconds, nothing is done any more. They remain. In a block 33a, however, for segments from the cluster X, which are shorter than 9 seconds and in which both the predecessor segment and the successor segment belong to the cluster Y, an assignment to the cluster Y is made, which automatically means that such a segment is merged both with the predecessor segment and the successor segment so that an overall longer segment develops, which is composed of the considered segment as well as the predecessor and the successor segment. Thus, by subsequent merging, a combination of at first separated segments via an intervening segment to be merged may succeed.

In a block 33b it is also laid out what happens with a segment that is shorter than 9 seconds and that is the only segment in a segment group. In the third segment class the segment No. 10 is the only segment. If it were shorter than 9 seconds, it is automatically associated with the segment class to which the segment No. 9 belongs. This automatically leads to merging the segment 10 with segment 9. If the segment 10 is longer than 9 seconds, this merging is not made.

In a block 33c then an examination is done for segments shorter than 9 seconds and that are not the only segments in a corresponding cluster X, i.e. in a corresponding segment group. They are subjected to a more detailed examination, in which a regularity in the cluster sequence is to be ascertained. At first, all the segments from the segment group X that are shorter than the minimum length are searched for. Then for each of these segments it is examined whether the predecessor and the successor segments each belong to a uniform cluster. If all predecessor segments are from a uniform cluster, all too short segments from the cluster X are associated with the predecessor cluster. If, however, all successor segments are from a uniform cluster, the too short segments from the cluster X are associated with the successor cluster.

Figure 9:
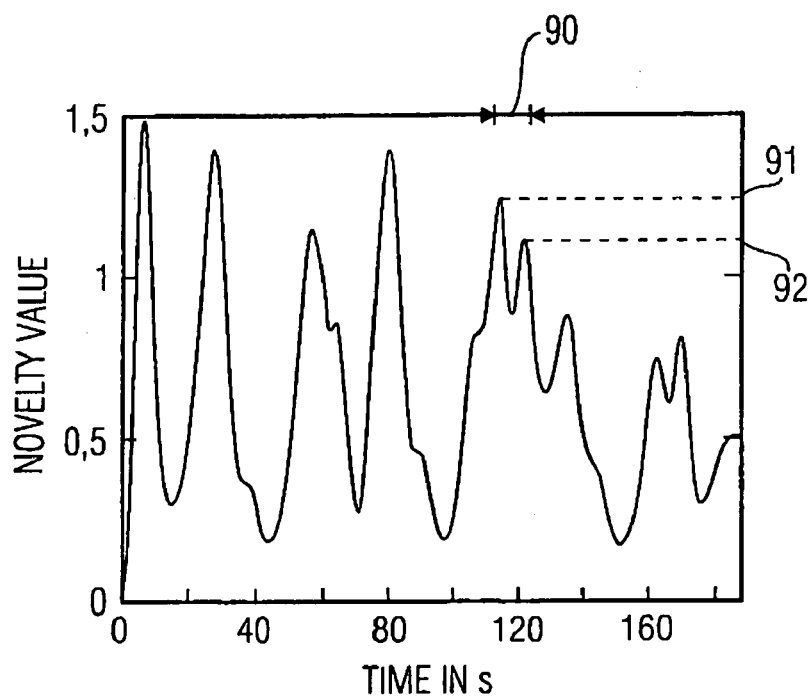
FIG. 9 is a schematic illustration of a smoothened novelty value.

In a block 33d it is set forth what happens when also this condition for segments shorter than 9 seconds is not met. In this case, a novelty value examination is performed by resorting to the novelty value curve illustrated in FIG. 9. In particular, the novelty curve arisen from the kernel correlation is read out at the locations of the segment boundaries involved, and the maximum of these values is determined. If the maximum occurs at a segment beginning, the too short segments are associated with the cluster of the successor segment. If the maximum occurs at a segment end, the too short segments are associated with the cluster of the predecessor segment. If the segment designated with 90 in FIG. 9 was a segment shorter than 9 seconds, the novelty examination would yield a higher novelty value 91 at the beginning of the segment 90 than at the end of the segment, wherein the novelty value at the end of the segment is designated as 92. This would mean that the segment 90 would be associated with the successor segment, because the novelty value to the successor segment is lower than the novelty value to the predecessor segment.

If now still segments remain which are shorter than 9 seconds and were not yet allowed to be merged, among these once again a staggered selection is performed. In particular, now all segments among the remaining segments that are shorter than 6 seconds are selected. The segments, the lengths of which are between 6 and 9 seconds from this group, are left "untouched".

The segments shorter than 6 seconds, however, are now all subjected to the novelty examination explained on the basis of the elements 90, 91, 92 and are either associated with the predecessor or successor segment, so that at the end of the post-correction algorithm shown in FIG. 3 all too short segments, namely all segments below a length of 6 seconds, have been intelligently merged with predecessor and successor segments.

This inventive procedure has the advantage that no elimination of parts of the piece has been performed, i.e. that no simple elimination of the too short segments by setting to zero has been performed, but that the entire complete piece of music is still represented by the entirety of the segments. By the segmentation therefore no information loss has occurred, which would be the case, however, if simply all too short segments would simply be eliminated "regardlessly" for example as a reaction to the over-segmentation.

Figure 4A:
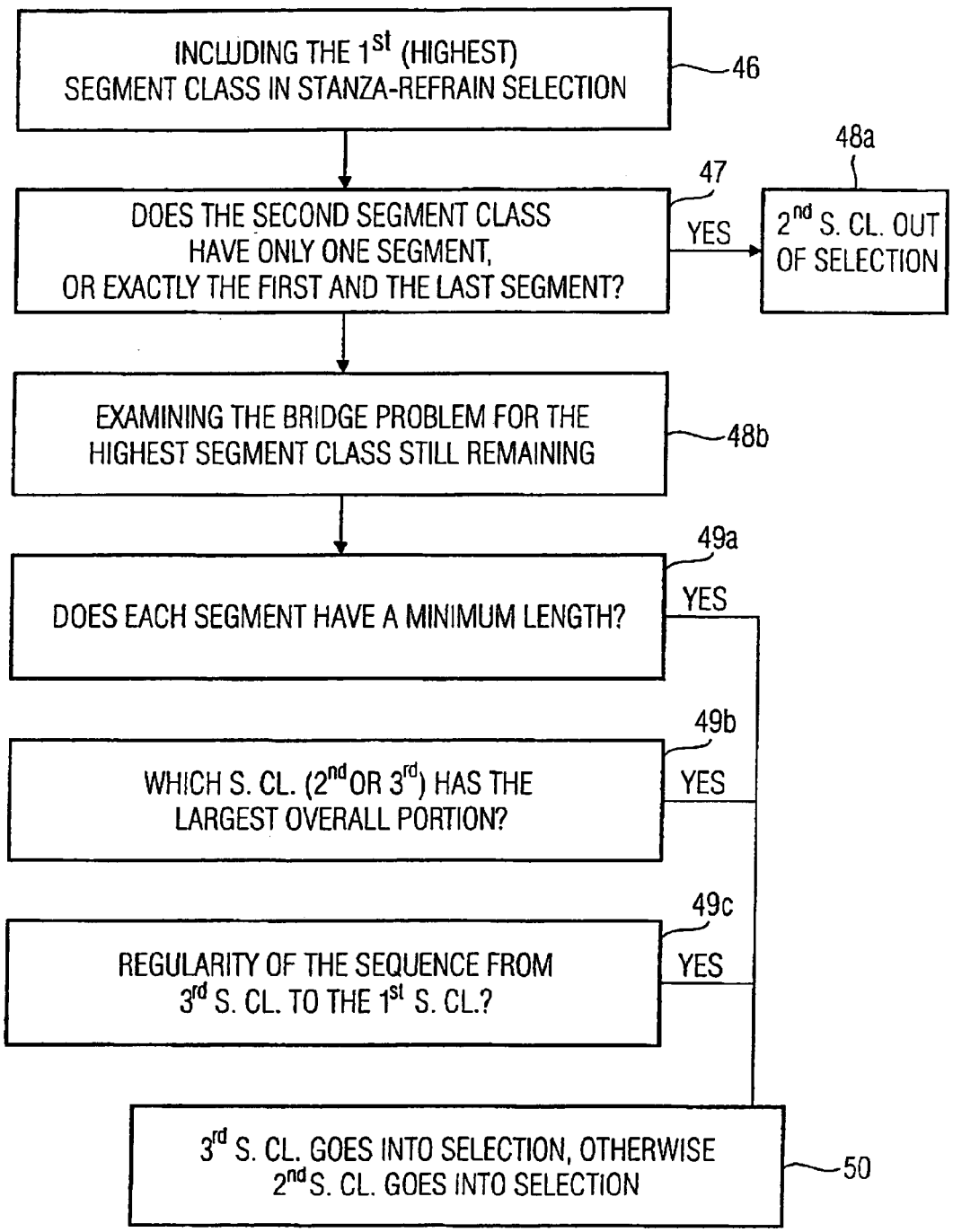
FIGS. 4a and 4b are a preferred embodiment of the segment class designation means.

Subsequently, with reference to FIG. 4a and FIG. 4b, a preferred implementation of the segment class designation means 22 of FIG. 1 is illustrated. According to the invention, when labeling two clusters, the labels "stanza" and "refrain" are assigned.

According to the invention, not a greatest singular value of a singular value decomposition and the accompanying cluster are used as refrain and the cluster for the second largest singular value as stanza. Furthermore, it is not basically assumed that each song starts with a stanza, i.e. that the cluster with the first segment is the stanza cluster and the other cluster is the refrain cluster. Instead, according to the invention, the cluster in the candidate selection having the last segment is designated as refrain, and the other cluster is designated as stanza.

For the two clusters that are in the end ready for the stanza/refrain selection, it is examined (40) which cluster has the segment occurring in the course of the song as last segment of the segments of the two segment groups, in order to designate the same as refrain.

The last segment may indeed be the last segment in the song or a segment occurring later in the song than all segments of the other segment class. If this segment is not in fact the last segment in the song, this means that also an outro is present.

This decision is based on the finding that the refrain in most cases comes after the last stanza in a song, i.e. directly as the last segment of the song, when a piece is faded out for example with the refrain, or as the segment before an outro, which follows a refrain and with which the piece is completed.

Figure 4B:
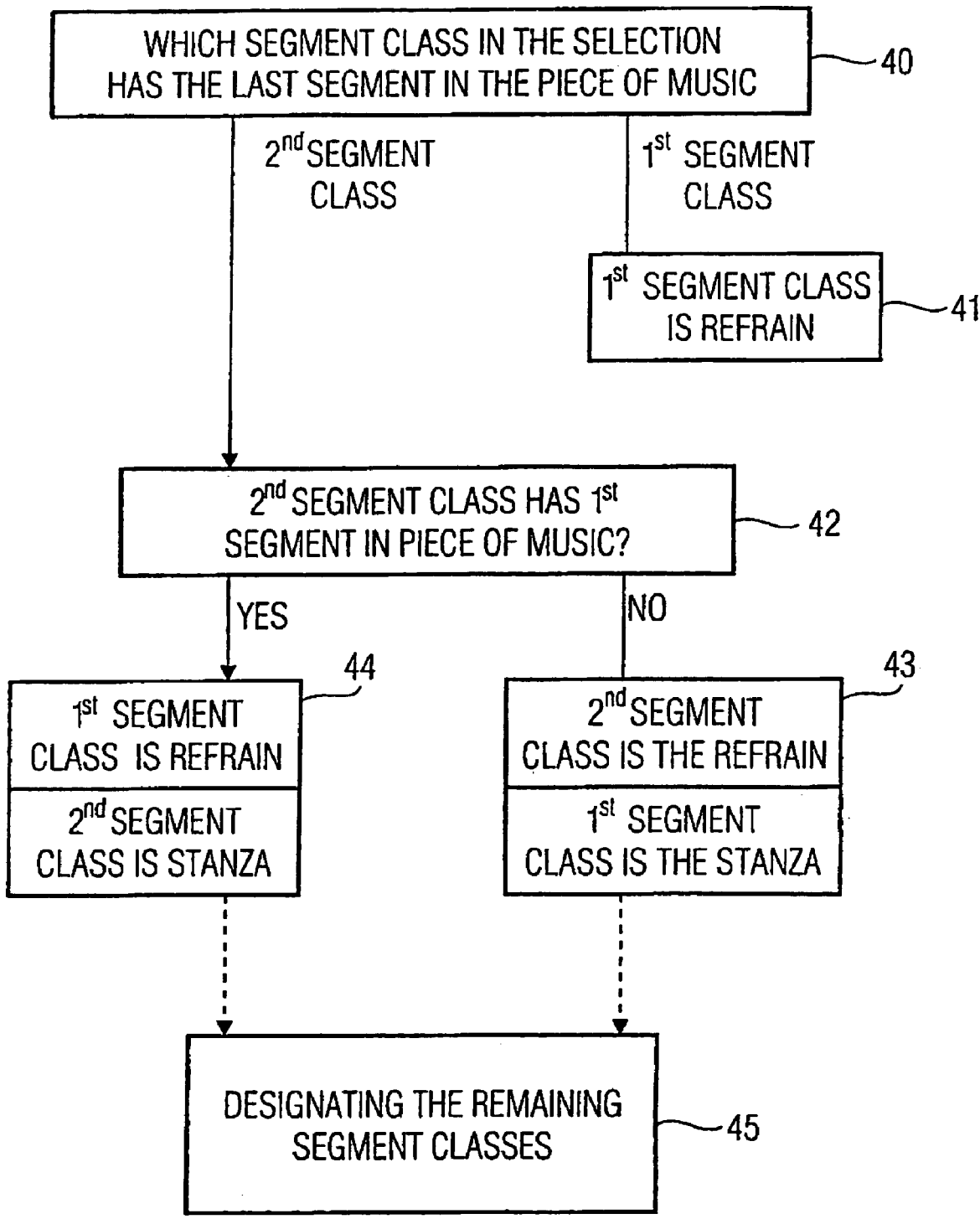
Figure 5:
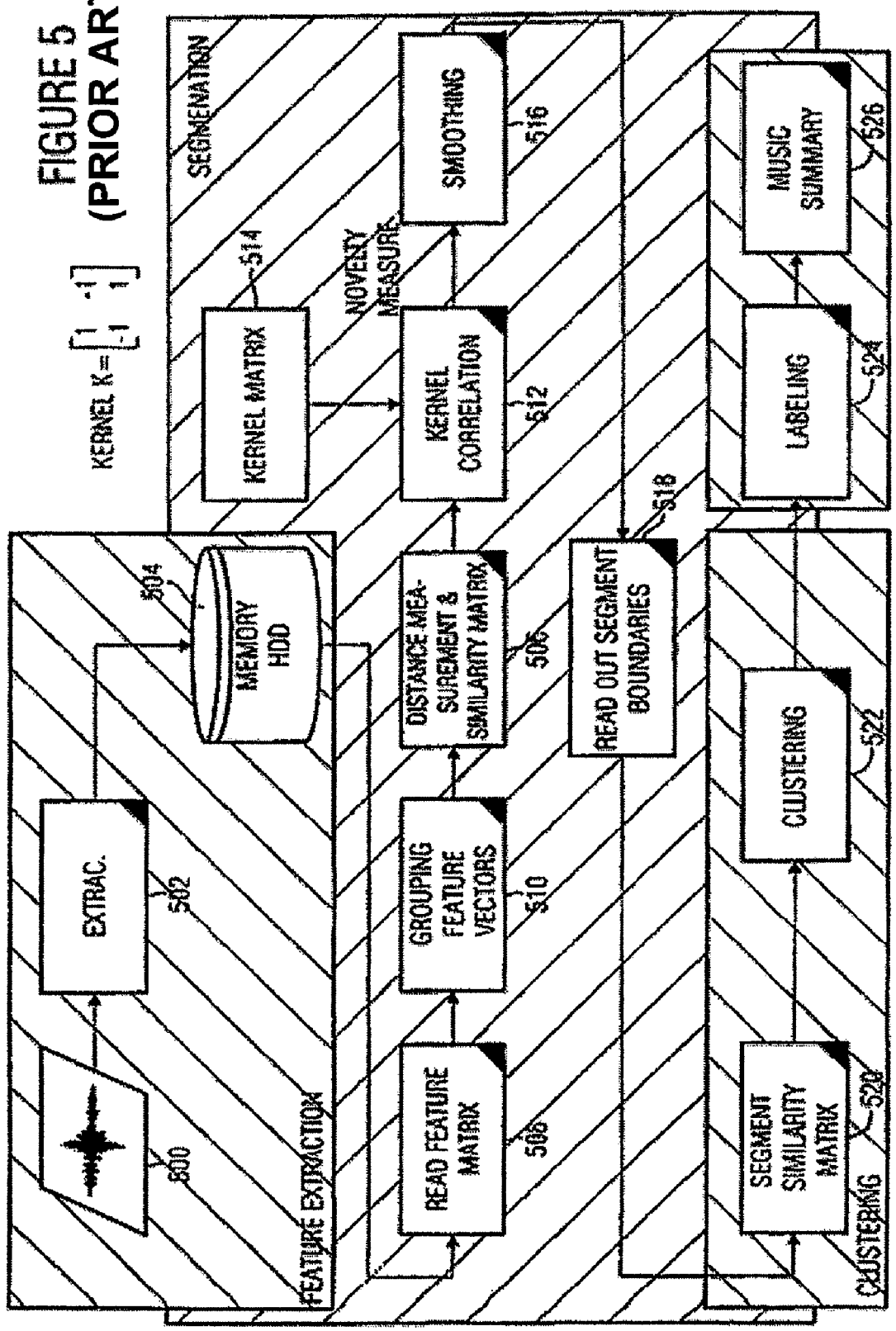
FIG. 5 is an overall block circuit diagram of an audio analysis tool.
Figure 6:
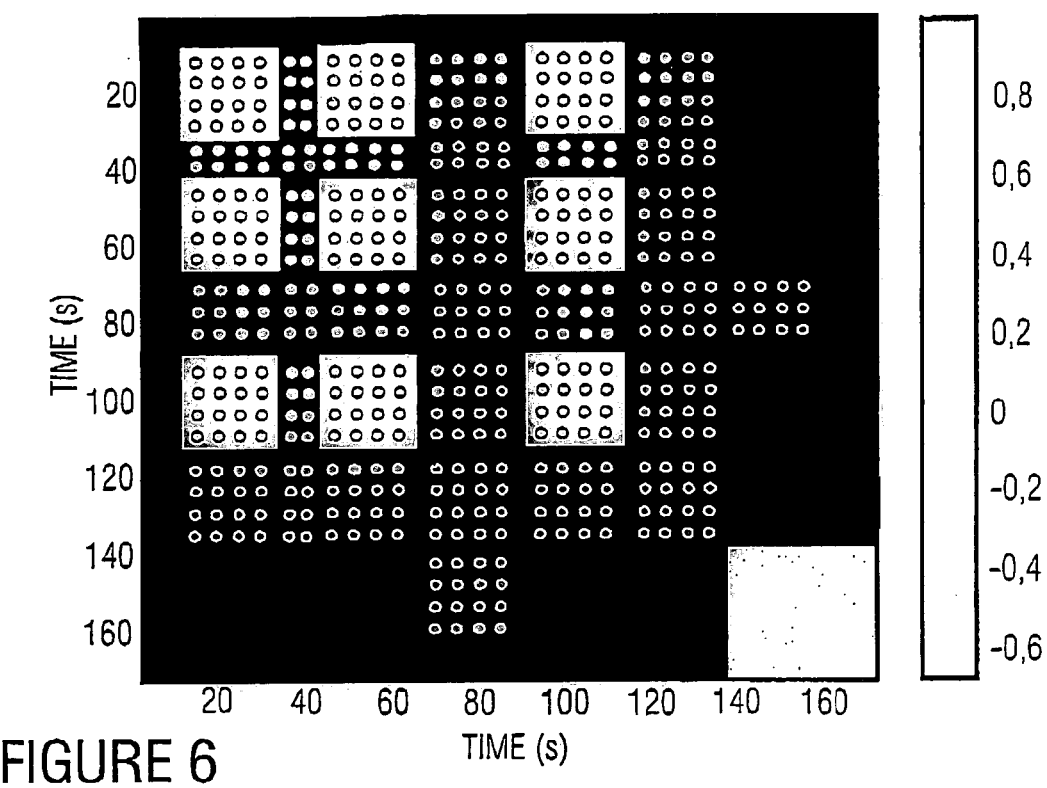
FIG. 6 is an illustration of an exemplary feature similarity matrix.

If the last segment is from the first segment group, all segments of this first (most significant) segment class are designated as refrain, as it is illustrated by a block 41 in FIG. 4b. In addition, in this case all the segments of the other segment class, which is for selection, are characterized as "stanza", because typically one class of the two candidate segment classes will have the refrain and thus immediately the other class the stanzas.

Yet if the examination in Block 40, namely which segment class in the selection the last segment in the course of the piece of music has, yields that this is the second, i.e. rather less significant segment class, in a block 42 it is examined whether the second segment class has the first segment in the piece of music. This examination is based on the finding that the probability is very high that a song begins with a stanza and not with a refrain.

If the question in block 42 is answered with "no", i.e. the second segment class does not have the first segment in the piece of music, the second segment class is designated as refrain and the first segment class is designated as stanza, as indicated in a block 43. If however the query in block 42 is answered with "yes", the second segment group is designated as stanza and the first segment group as refrain against the rule, as it is indicated in a block 44. The designation in block 44 happens because the probability that the second segment class corresponds to the refrain is very low. If now the improbability of a piece of music being introduced with a refrain is added, a lot points to an error in clustering, e.g. that the last considered segment was wrongly associated with the second segment class.

In FIG. 4b it was illustrated how on the basis of two available segment classes the stanza/refrain determination has been performed. After this stanza/refrain determination, then the remaining segment classes may be designated in a block 45, wherein an outro will be, if required, the segment class having the last segment of the piece as such, whereas an intro will be the segment class having the first segment of a piece as such.

Subsequently, on the basis of FIG. 4a, it will be illustrated how the two segment classes are determined which are the candidates for the algorithm shown in FIG. 4b.

In general, in labeling an assignment of the label "stanza" and "refrain" is performed, wherein a segment group is marked as stanza segment group, whereas the other segment group is marked as refrain segment group. Basically, this concept is based on the assumption (A1) that the two clusters (segment groups) with the highest similarity values, i.e. cluster 1 and cluster 2, correspond to the refrain and stanza clusters. The last one occurring of these two clusters is the refrain cluster, wherein it is assumed that a stanza follows the refrain.

The experience from numerous tests has shown that cluster 1 in most cases corresponds to the refrain. For cluster 2 the assumption (A1), however, is often not met. This situation mostly occurs when there is either still a third, frequently repeating part in the piece, e.g. a bridge, with a high similarity of intro and outro, or for the case not uncommonly occurring that a segment in the piece has a high similarity to the refrain, thus also a high overall similarity, but the similarity to the refrain is just not great enough to still belong to cluster 1.

Surveys have shown that this situation often occurs for variations of the refrain at the end of the piece. In order to label refrain and stanza accurately with highest possible reliability, the segment selection described in FIG. 4b is enhanced in that, as it is illustrated in FIG. 4a, the two candidates for the stanza/refrain selection are determined depending on the segments present therein.

At first in a step 46 the cluster or the segment group with the highest similarity value (value of the component of V that was once a maximum for the first determined segment class, i.e. segment 7 in the example of FIG. 7), i.e. the segment group having been determined in the first pass of FIG. 1, is included in the stanza/refrain selection as first candidate.

It is now in question which further segment group will be the second member in the stanza/refrain selection. The most probable candidate is the second highest segment class, i.e. the segment class found in the second pass through the concept described in FIG. 1. This does not always have to be like that. Therefore it is at first examined for the second highest segment class (segment 5 in FIG. 7), i.e. cluster 2, whether this class only has a single segment or exactly two segments, wherein one of the two segments is the first segment and the other segment of the two is the last segment in the song (block 47).

If on the other hand the question is answered with "no", the second highest segment class at least has for example three segments, or two segments, one of which is within the piece and not at the "edge" of the piece, the second segment class remains in the selection for the time being and is designated as "second cluster" from now on.

If the question in block 47, however, is answered with "yes", i.e. the second highest class drops out (block 48a), it is replaced by the segment class occurring most frequently in the entire song (in other words: containing the most segments) and not corresponding to the highest segment class (cluster 1). This segment class is from now on designated as "second cluster".

"Second cluster", as will be set forth in the following, still has to measure up with a third segment class (48b) designated as "third cluster" to survive the selection process as a candidate in the end.

The segment class "third cluster" corresponds to the cluster that occurs most frequently in the entire song but neither corresponds to the highest segment class (cluster 1) nor the segment class "second cluster", so to speak the next most frequently (often also equally frequently) occurring cluster after cluster 1 and "second cluster".

Regarding the so-called bridge problem, it is now examined for "third cluster" whether it belongs rather to the stanza/refrain selection than to "second cluster" or not. This happens because "second cluster" and "third cluster" often occur equally often, i.e. one of the two potentially represents a bridge or another repeating intermediate part. In order to ensure that the segment class of the two most likely corresponding to the stanza or the refrain is selected, i.e. not a bridge or another intermediate part, the examinations illustrated in the blocks 49a, 49b, 49c are performed.

The first examination in block 49a is to the effect that it is examined whether each segment from thirdcluster has a certain minimum length, wherein as threshold value e.g. 4% of the entire song length is preferred. Other values between 2% and 10% may also lead to reasonable results.

In a block 49b it is then examined whether thirdcluster has a larger overall portion of the song that secondcluster. For this, the overall time of all the segments in thirdcluster is added and compared with the correspondingly added overall number of all the segments in secondcluster, wherein then thirdcluster has a larger overall portion of the song than secondcluster when the added segments in thirdcluster yield a greater value that the added segments in secondcluster.

In the block 49c finally, it is examined whether the distance of the segments from thirdcluster to the segments for cluster 1, i.e. the most frequent cluster, is constant, i.e. whether a regularity in the sequence can be seen.

If all these three conditions are answered with "yes", thirdcluster goes into the stanza/refrain selection. If however at least one of these conditions is not met, thirdcluster does not go into the stanza/refrain selection. Instead, secondcluster goes into the stanza/refrain selection, as it is illustrated by a block 50 in FIG. 4*a*. With this, the "candidate search" for the stanza/refrain selection is completed, and the algorithm shown in FIG. 4*b* is started, in which at the end it is certain which segment class includes the stanzas and which segment class includes the refrain.

At this point it is to be pointed out that the three conditions in the blocks 49*a*, 49*b*, 49*c* might alternatively be weighted, so that for example an answer no in block 49*a* is then "overridden" when both the query in block 49*b* and the query in block 49*c* are answered with "yes". Alternatively, also a condition of the three conditions could be highlighted so that it is for example only examined whether the regularity of the sequence between the third segment class and the first segment class exists, whereas the queries in blocks 49*a* and 49*b* are not performed or only performed when the query in block 49*c* is answered with "no", but e.g. a relatively large overall portion in block 49*b* and relatively large minimum amounts in block 49*a* are determined.

Alternative combinations are also possible, wherein for a low-level examination also only the query of one of blocks 49*a*, 49*b*, 49*c* will be sufficient for certain implementations.

Subsequently, exemplary implementations of the block 526 for performing a music summary are set forth. There are various possibilities as to what can be stored as a music summary. Two thereof are described in the following, namely the possibility with the title "refrain" and the possibility with the title "medley".

The refrain possibility consists in choosing a version of the refrain as summary. Herein it is attempted to choose an example of the refrain that is between 20 and 30 seconds long, if possible. If a segment with such length is not contained in the refrain cluster, a version is chosen which has a smallest possible deviation to a length of 25 seconds. If the chosen refrain is longer than 30 seconds, it is faded out in this embodiment over 30 seconds and if it is shorter than 20 seconds it is made longer to 30 seconds with the ensuing segment.

Storing a medley for the second possibility also rather corresponds to an actual summary of a piece of music. Herein a section of the stanza, a section of the refrain, and a section of a third segment are constructed as medley in their actual chronological order. The third segment is chosen from a cluster that has the largest overall portion of the song and is not stanza or refrain.

The most suitable sequence of the segments is searched for with the following priority:

"third segment"-stanza-refrain;

stanza-refrain-"third segment"; or stanza-"third segment"-refrain.

The chosen segments are not built into the medley in their full length. The length is preferably fixed to 10 seconds per segment, so that altogether again a summary of 30 seconds arises. Alternative values can, however, also be easily realized.

For computation time saving, grouping of several feature vectors is performed in block 510 after the feature extraction in block 502 or after block 508 by forming a mean value over the grouped feature vectors. The grouping may save computation time in the next processing step, the calculation of the similarity matrix. For the calculation of the similarity matrix, a distance is determined between all possible combinations of two feature vectors each.

Therefrom n×n calculations result with n vectors over the entire piece. A grouping factor g indicates how many successive feature vectors are grouped to a vector via the mean value formation. Thereby, the number of computations may be reduced.

The grouping is also a kind of noise suppression, in which small changes in the feature expression of successive vectors are compensated on average. This property has a positive effect on finding large song structures.

The inventive concept enables, by means of a special music player, to navigate through the calculated segments and to select individual segments in a targeted manner, so that a consumer in a music store may easily jump to the refrain of a piece immediately by for example using a certain key or by activating a certain software command, in order to ascertain whether they like the refrain, in order to then maybe still listen to a stanza, so that the consumer may finally take a decision to buy. Thus it is possible, in a comfortable manner, for a consumer interested in buying, to hear exactly from a piece what they are particularly interested in, while in fact being able to save e.g. the solo or the bridge for the pleasure of hearing at home.

Alternatively, the inventive concept is also of great advantage for a music store, because a customer may listen in and in the end buy in a targeted and thus also quick manner, so that the other customers do not have to wait long to listen in, but also quickly get their turn. This is due to the fact that users do not constantly have to wind back and forth, but obtain all the information on the piece they want to have in a targeted and quick manner.

Furthermore, a substantial advantage of the inventive concept is to be pointed out, namely that in particular due to the post-correction of the segmentation no information on the piece is lost. Of course all segments that are preferably shorter than 6 seconds are merged with the predecessor or successor segment. But no segments, as short as they may be, are eliminated. This has the advantage that the user may in principle listen to everything in the piece, so that a short but very pleasing prominent piece for the user, which would have been dropped in a segmentation post-correction, which would in fact have completely eliminated a section of the piece, is nevertheless available to the user so that he can take a well thought-out decision to buy maybe exactly due to the short prominent piece.

The present invention is, however, also applicable in other application scenarios, for example in advertising monitoring, i.e. where an advertising client would like to check whether the audio piece for which he bought advertising time has actually been played over the entire length. An audio piece may for example include music segments, speaker segments, and noise segments. The segmentation algorithm, i.e. the segmentation and subsequent classification into segment groups, then enables quick and substantially less intensive examination than a complete sample-wise comparison. The efficient examination would simply consist in a segment class statistic, i.e. a comparison how many segment classes have been found and how many segments are in the individual segment classes, with a default due to the ideal advertising piece. With this, an advertising client may easily recognize if a radio station or television station has actually broadcast all the main parts (sections) of the advertising signal or not.

The present invention is further advantageous in that it may be employed for research in large music databases to for example listen to only the refrains of many pieces of music, in order to then perform a music program selection. In this case only individual segments from the segment class labeled "refrain" of many different pieces would be selected and provided by a program provider. Alternatively, there could also be interest in comparing all for example guitar solos of one artist with each other. According to the invention, these may also easily be provided by e.g. always joining together one or several segments (if present) in the segment class designated "solo" from a large number of pieces of music and providing them as a file.

Still other application possibilities consist in mixing stanzas and refrains from various audio pieces, which will be of particular interest for DJs and opens up completely new possibilities of creative music synthesis, which may be performed easily and above all automatically in an accurately targeted manner. The inventive concept can be easily automated, because it does not require user intervention at any point. This means that users of the inventive concept do not need any special training at all, except for example usual skill working with normal software user interfaces.

Depending on the practical circumstances, the inventive concept may be implemented in hardware or in software. The implementation may take place on a digital storage medium, in particular a floppy disk or CD with electronically readable control signals, which can cooperate with a programmable computer system so that the corresponding method is executed. In general, the invention does also consist in a computer program product with a program code stored on a machine-readable carrier for executing the inventive method, when the computer program product is executed on a computer. In other words, the invention thus represents a computer program with a program code for performing the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for designating several segment classes to which temporal segments are assigned due to segment similarities, wherein the segments represent an audio piece, which is structured into main parts repeatedly occurring in the audio piece, comprising:
   a provider for providing a representation of the audio piece, in which the segments of the audio piece are assigned to various segment classes, wherein one segment class each can be associated with a main part; and
   a segment class designator formed to
      perform the main part selection for a first first-order candidate segment class and for a second second-order candidate segment class, wherein the second order is lower than the first order regarding a similarity of segments of the second candidate segment class to segments of the audio piece,
      examine whether the first-order candidate segment class has the temporally later segment in the audio signal, and
      designate the first-order candidate segment class as refrain segment class when it has the temporally later segment and to designate the second-order candidate segment class as stanza segment class.

2. The apparatus of claim 1, wherein the audio piece is a piece of music.

3. The apparatus of claim 1, wherein a candidate segment class has a higher order when a similarity value of the candidate segment class indicates that a segment in the candidate segment class is more similar to all segments in the audio piece altogether than a segment of the other candidate segment class.

4. The apparatus of claim 1, wherein the segment class designator is formed to determine a similarity value of a segment by addition of all values in a row or column of the similarity matrix, wherein the row or column is associated with the segment.

5. The apparatus of claim 4, wherein the provider is formed to perform an iterative segment class assignment due to a similarity matrix, wherein a segment is associated with each row or column of the similarity matrix, and wherein in a first iteration step for a row or column of the similarity matrix having the highest similarity value a segment assignment to a first-order segment class is performed, wherein then for segments that have been associated, corresponding rows or columns of the similarity matrix are ignored for further assignment, and wherein then in a second iteration step for a still remaining row or column of the similarity matrix that has the highest similarity value a segment assignment to a second-order segment class is performed.

6. The apparatus of claim 1, wherein the segment class designator is formed to examine which of the candidate segment classes has the temporally later segment in the audio signal, in order to then further examine whether the second segment class has an earlier segment in the music signal than the other candidate segment class, when the second candidate segment class has the temporally later segment.

7. The apparatus of claim 6, wherein the segment class designator is formed to designate the first candidate segment class as refrain segment class and the second candidate segment class as stanza segment class, when the second candidate segment class has the earlier segment in the piece of music.

8. The apparatus of claim 6, wherein the segment class designator is formed to designate the first candidate segment class as stanza segment class and the second candidate segment class as refrain segment class, when the first candidate segment class has the temporally earlier segment in the piece of music.

9. The apparatus of claim 1, wherein the segment class designator is further formed to use a first segment class with a highest order as first candidate segment class, and to perform a determination to determine a second candidate segment class equal to the second segment class with a lower order.

10. The apparatus of claim 9, wherein the segment class designator is formed to examine in the determination whether the second segment class has exactly one segment and has exclusively the first or last segment of the audio signal, in order not to use the second-highest-order segment class as second candidate segment class when this is the case.

11. The apparatus of claim 10, wherein the segment class designator is formed to examine in the determination whether the second segment class has more than one segment and has not exclusively the first or last segment of the audio signal, in order to examine a third segment class when this is the case, to use the third segment class or the second-order segment class as second candidate segment class.

12. The apparatus of claim 11, wherein the segment class designator is formed to perform at least one of the following examinations for the third segment class, wherein a first examination consists in ascertaining whether each segment of the third segment class has a minimum length, wherein a second examination consists in ascertaining which segment class out of the second and the third segment class has a larger overall portion of the audio piece, and wherein a third examination consists in ascertaining whether a regularity of the sequence of segments in the third segment class to segments in the first segment class exists, wherein the segment class designator is further formed to use the second segment class or the third segment class as second candidate segment class on the basis of at least one of the examinations.

13. The apparatus of claim 12, wherein the segment class designator is formed to use the third segment class as the second candidate segment class, when all three examinations are answered with "yes", and otherwise to use the second segment class as the second candidate segment class.

14. The apparatus of claim 1, wherein the provider for providing comprises:

a provider for providing a similarity representation for the segments, wherein the similarity representation comprises an associated plurality of similarity values for each segment, wherein the similarity values indicate how similar a segment is to each other segment of the audio piece;

a calculator for calculating a similarity threshold value for a segment using the plurality of similarity values associated with the segment; and an assigner for assigning a segment to a segment class, when the similarity value of the segment meets a predetermined condition with reference to the similarity threshold value.

15. The apparatus of claim 14, further comprising:

a segment selector for determining an extreme segment, the associated plurality of similarity values of which comprises an extreme when considered together, wherein the calculator is formed to calculate the similarity threshold value for the extreme segment, and wherein the assigner is formed to characterize the segment class with an indication to the extreme segment.

16. The apparatus of claim 14, wherein the assigner is formed not to assign a segment not meeting the predetermined condition with reference to the similarity threshold value to the segment class, but to leave it for an association with another segment class, and wherein the assigner is formed to no longer take the similarity value of the segment into account for an associated segment in the assignment to another segment class.

17. The apparatus of claim 14, wherein the calculator for calculating the similarity threshold value in a later pass is formed to ignore similarity values for segments assigned earlier in the plurality of similarity values after earlier assignment of a segment class, and wherein the assigner is formed to execute an assignment to another segment class in a later pass than the segment class in an earlier pass.

18. A method of designating various segment classes, to which temporal segments are assigned due to segment similarities, wherein the segment similarities are assigned, wherein the segments represent an audio piece that is structured into main parts repeatedly occurring in the audio piece, comprising:

providing a representation of the audio piece, in which the segments of the audio piece are assigned to various segment classes, wherein one segment class each can be associated with a main part, and designating the segment classes by performing the main part selection for a first first-order candidate segment class and for a second second-order candidate segment class, wherein the second order is lower than the first order regarding a similarity of the segments of the second candidate segment class to segments of the audio piece, by examining whether a first-order candidate segment class has the temporally later segment in the audio signal, and by designating the first-order candidate segment class as refrain segment class, when it has the temporally later segment, and designating the second-order candidate segment class as stanza segment class.

19. A computer program stored on a computer readable medium for executing, when the computer program is executed on a computer, a method of designating various segment classes, to which temporal segments are assigned due to segment similarities, wherein the segment similarities are assigned, wherein the segments represent an audio piece that is structured into main parts repeatedly occurring in the audio piece, comprising:

providing a representation of the audio piece, in which the segments of the audio piece are assigned to various segment classes, wherein one segment class each can be associated with a main part, and designating the segment classes by performing the main part selection for a first first-order candidate segment class and for a second second-order candidate segment class, wherein the second order is lower than the first order regarding a similarity of the segments of the second candidate segment class to segments of the audio piece, by examining whether a first-order candidate segment class has the temporally later segment in the audio signal, and by designating the first-order candidate segment class as refrain segment class, when it has the temporally later segment, and designating the second-order candidate segment class as stanza segment class.

* * * * *